Aug. 3, 1954   S. S. BROWN   2,685,667
ELECTRIC MOTOR AND METHOD OF OPERATION
Filed March 19, 1952
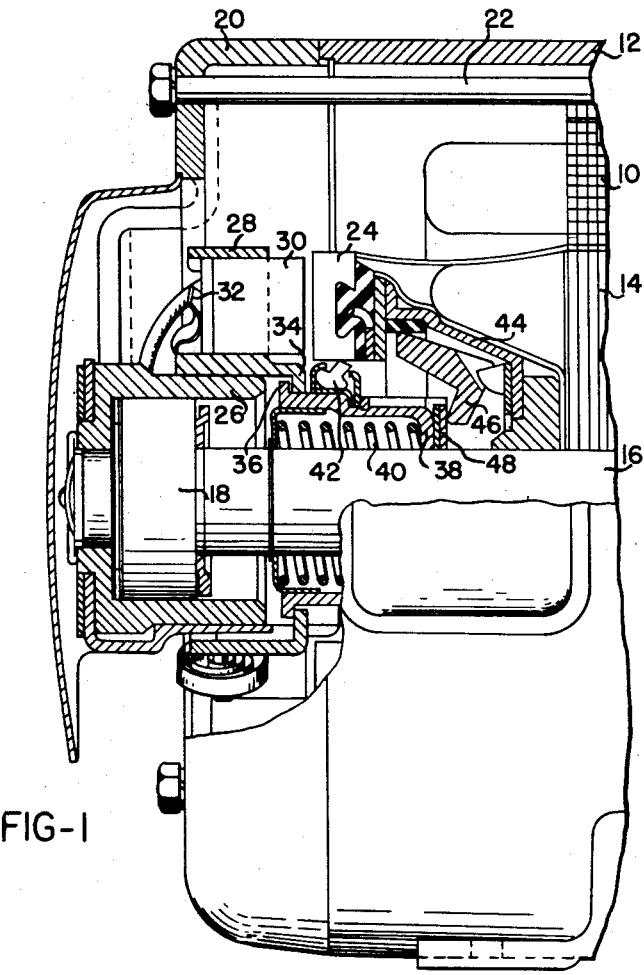
FIG-1
FIG-2
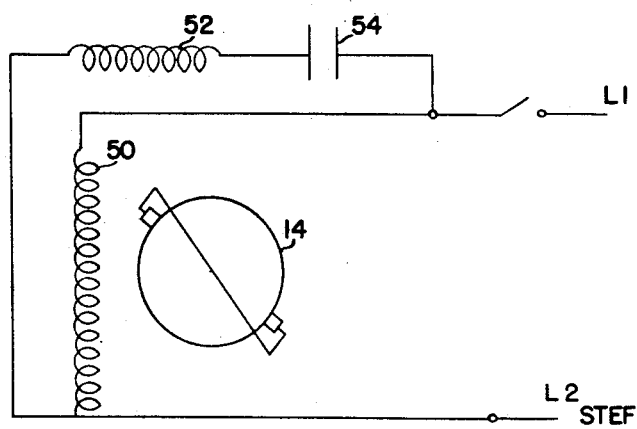
INVENTOR
STEFFEN S. BROWN
BY
ATTORNEYS Patented Aug. 3, 1954

2,685,667

UNITED STATES PATENT OFFICE 2,685,667

ELECTRIC MOTOR AND METHOD OF OPERATION

Steffen S. Brown, Dayton, Ohio, assignor to The Brown-Brockmeyer Company, Dayton, Ohio, a corporation of Ohio Application March 19, 1952, Serial No. 277,495

2 Claims. (Cl. 318—196)

This invention relates to electric motors, particularly to alternating current motors, and more particularly still to single-phase alternating current motors.

Single-phase alternating current motors, particularly the smaller sizes thereof, are widely used and for a great many different purposes. One of the large uses of small single-phase alternating current motors is in connection with household appliances and the like, such as washers, ironers, refrigerators, furnace motors and other devices. In general, one of the most desirable qualities a motor can have in connection with such appliances is quietness of operation and efficiency. At the same time, many of these motors are required to start up under rather heavy loads and for this reason must also, in general, be characterized by a relatively high starting torque.

The construction of such a motor as a repulsion start-induction run motor fulfills the above requirements with the exception that such motors are not always as quiet in operation or as efficient as could be desired.

The lack of quietness usually occurs on account of the brushes riding on the commutator and, additionally, there is often a hum created by the rotation of the armature of such a motor in the pulsating field. The pulsating field of such a single-phase motor likewise creates some inefficiency of operation due to eddy current losses and the like, because the armature encounters a field of continuously varying intensity as it rotates.

The problem of the noise of the brushes on the commutator can be taken care of by providing a brush-lifting arrangement by means of which the brushes are lifted off the commutator when the short circuiter of the motor short circuits the commutator. This also leads to a slight increase in efficiency of operation by the elimination of brush friction.

The matter of the variable field can be dealt with by supplying an auxiliary winding on the motor stator suitable in quadrature with the main winding, and including in circuit therewith reactance means, preferably a capacitor, which will shift the phase angle of the quadrature winding 90° from the phase angle of the main running winding of the motor. This has the effect of converting the pulsating field of the motor into one which, so far as the armature of the motor is concerned, is of a rotating nature, thereby leading to more uniform magnetic conditions about the armature and, therefore, more quiet and efficient operation.

While the comments above have been directed to small single-phase alternating current motors, it will be understood that in many instances, such as in industrial refrigeration units and the like, the motor encountered might be of a larger type up to, say, several horse power.

In my previously filed applications, Patent No. 2,543,149, issued February 27, 1951, and Serial No. 264,056, filed December 29, 1951, there is illustrated electric motors utilizing quadrature auxiliary windings having in series therewith phase shifting capacitors and, in the case of the first filed of said applications, a brush ring controlled switch for making the quadrature winding effective and, in the case of the latter filed application, an electrically operated relay responsive to voltage fluctuations in the field winding of the motor at the time of short circuiting the commutator for making the quadrature winding effective.

While the foregoing arrangements are satisfactory and lead to satisfactory operation of the motor and may, in fact, even be preferred in certain instances, I have found, by test and experiment, that in most cases the quadrature winding with the phase-shifting capacitor can be maintained in the motor circuit in parallel with the main running winding and perfectly satisfactory operating conditions will be obtained.

By satisfactory operating conditions is meant a good starting torque, a quick pulling in to running speed, good overload characteristics, and efficient operation. Additionally, maintaining the auxiliary winding in circuit at all times eliminates the need for switches of the nature referred to above and thus it makes the motor much simpler and more inexpensive to construct and eliminates the possibility of the said switches requiring maintenance.

I have found that the use of an auxiliary winding, including a phase-shifting capacitor that is maintained in the motor circuit at all times in combination with a brush lifting arrangement, yields an extremely quiet and efficient motor, particularly adapted for use where these characteristics are paramount.

With the foregoing in movement, the particular object of the present invention is the provision of a single phase alternating current motor which is extremely quiet and efficient in operation.

Another object of this invention is the provision of a single-phase alternating current motor having an auxiliary field winding in which control switches for the auxiliary winding are entirely eliminated.

These and other objects and advantages will become more apparent upon reference to the following description taken in connection with the accompanying drawings, wherein:

Figure 1 is a fragmentary sectional view of a typical electric motor of the brush lifter type adapted for being constructed and operated in accordance with my invention;

Figure 2 is a diagrammatic illustration of the electric circuit of the motor.

Referring to the drawing somewhat in more detail, the motor in Figure 1 comprises a stator 10 suitably carried in a frame 12 and within which stator there is rotatably mounted the wound armature 14 mounted on shaft 16, journalled at its opposite ends in bearings 18, carried by end covers 20 clamped to opposite ends of frame 12 as by the through bolts 22.

The armature 14 carries at one end a commutator 24 of the radial bar type and slidably mounted on the cylindrical portion 26 of the adjacent end bell that houses bearing 18 is a brush ring 28, carrying brushes 30 adapted for resiliently engaging commutator 24 by means of the springs 32.

The brush ring has an inwardly projecting annular flange 34 positioned to the right, as viewed in Figure 1, of an outwardly projecting flange 36 of a cup-shaped element 38 that is slidable on shaft 16.

A spring 40 biases element 38 rightwardly so that normally brush ring 28 is in position for the brushes 30 to bear on commutator 24.

When the member 38 is so positioned a short circuiter 42, carried thereby, is so positioned that its segments are spaced from the bars of the commutator. When member 38 is shifted leftwardly into the position illustrated in Figure 1, the brush ring is moved to a point where the brushes 30 are spaced from the commutator bars, whereas, the short circuiter 42 is positioned in the plane of the commutator bars and short circuits the said bars according to well-known practices.

The back or supporting portion of commutator 24 consists of a frustoconical shell 44 and positioned therein is a plurality of L-shaped weights 46 having their shorter legs engaging the washers 48 that are at the right end of member 38 and having their longer legs extending along the side of member 38.

It will be apparent that at a predetermined rotational speed the weights 46 will throw outwardly toward their Figure 1 position, overcoming spring 40, and shifting member 38 into position to lift the brushes from the commutator while simultaneously moving short-circuiter 42 into position to short circuit the commutator.

The motor will, therefore, start as a repulsion motor with correspondingly high starting torque and will thereafter run as an induction motor with correspondingly constant speed characteristics.

The field carried by stator 10 consists of a main field winding 50 and an auxiliary winding 52 located on the stator substantially 90 electrical degrees out of phase with the main winding. Auxiliary winding 52 has in circuit therewith a capacitor 54 so that the phase angle of winding 52 is substantially in quadrature with the phase angle of winding 50, thereby resulting in a rotating, substantially uniform, field in which the rotor 14 of the motor turns.

As explained in the opening paragraphs in this application, the described arrangement results in an extremely quiet and efficient motor and one which is particularly adapted for use in all locations where these characteristics are to be desired while, at the same time, the motor must exhibit high starting torque and substantially constant speed.

It has been mentioned that this invention is applicable to both small and fairly large motors and as specific example of one motor which has been constructed in this manner and found to operate in the advantageous manner set forth, a three horse power motor was provided with a main winding of 19 turns of No. 14 wire. The auxiliary winding in quadrature therewith was provided with 80 turns of No. 18 wire, and the capacitor connected in series with the auxiliary winding was 40 microfarads in size and was of the oil filled type.

It was found that this motor has the required amount of starting torque, even though the auxiliary winding was maintained in circuit with the main winding at all times, quickly came up to running speed, had satisfactory pull-out torque, and was extremely quiet and efficient in operation.

It will be understood that this invention is susceptible to modification in order to adapt it to different usages and conditions, and, accordingly, it is desired to comprehend such modifications within this invention as may fall within the scope of the appended claims.

I claim:

1. In a single-phase electric motor of substantially three horsepower; a stator having a main running winding of substantially nineteen turns thereon, a wound rotor rotatable in the stator and having a commutator, brushes bearing on the commutator, means operable at a predetermined speed of rotation of said rotor for lifting the brushes from the commutator and for short circuiting the commutator, and an auxiliary winding of substantially eighty turns on said stator in space quadrature with said main winding, said auxiliary winding having a capacitor in series therewith, and said auxiliary winding-capacitor branch being permanently connected in parallel with said main winding, said capacitor being of the oil filled type.

2. In a single phase alternating current electric motor of the order of three h. p.; a stator having a wound rotor rotatable therein, said wound rotor including a radial bar type commutator, a brush ring adjacent to the commutator, axially extending brushes in the commutator for bearing against the bars thereof, a centrifugally operated brush lifter carried by said rotor and operable at a predetermined rotor speed to bring about movement of the brush ring to lift the brushes from said bars, a short circuiter movable with said brush ring operable to short-circuit said commutator when the brushes are lifted therefrom, a main running winding of substantially 19 turns on said stator, an auxiliary winding of substantially 80 turns also on said stator in space quadrature with said main running winding, an oil filled capacitor in series with said auxiliary winding, and said auxiliary winding-capacitor branch being at all times connected in parallel with said main winding.

References Cited in the file of this patent

UNITED STATES PATENTS

| Number | Name | Date |
| --- | --- | --- |
| 1,934,909 | Bretch | Nov. 14, 1933 |
| 2,543,149 | Brown | Feb. 27, 1951 |